Patented Aug. 23, 1938

2,127,560

UNITED STATES PATENT OFFICE 2,127,560

RUBBER COMPOUNDING

George S. Haslam, Palmerton, Pa., assignor to The New Jersey Zinc Company, New York, N. Y., a corporation of New Jersey No Drawing. Original application April 6, 1935, Serial No. 15,096. Divided and this application October 31, 1936, Serial No. 108,617

8 Claims. (Cl. 106—23)

This invention relates to rubber compounding and particularly to rubber compounding in which pigments are incorporated with the rubber and has for one of its objects the provision of an improved method of rubber compounding.

This application is a division of my co-pending application Serial No. 15,096, filed April 6, 1935.

The improved method of the invention comprises adding to the rubber compound as a reinforcing agent a pigment having its discrete particles coated with a proteinaceous substance. Zinc oxide having its particles so coated may be used with special advantages in rubber compounding. Other rubber pigments, such as whiting (calcium carbonate), blanc fixe (precipitating barium sulphate), zinc sulphide, lithopone and more particularly crude (uncalcined) lithopone, etc., may be advantageously coated with appropriate proteinaceous substances and added to the rubber compound in accordance with the invention. The proteinaceous coating on the pigment particles is extremely thin, and the amount of proteinaceous substance associated with the pigment, substantially in the form of a coating on the individual pigment particles, is usually from about 1 to 2% by weight on the weight of pigment.

In carrying out the invention, the pigment is treated with a suitable protein in such a manner as to coat the surface of the particles with a small amount of the protein, say 1 to 2% by weight. The treatment can be applied to any pigment capable of reacting with or adsorbing the proteinaceous substance. Casein, glue, hemoglobin, egg albumen and glycine are examples of proteinaceous substances suitable for practicing the invention.

A colloidal solution of casein may be prepared by peptizing the casein in water in any approved manner, as, for example, as follows:

(1) Forty grams of casein are added to 600 cc. of cold water, the temperature raised to from 60 to 70° C., then 12 cc. of ammonium hydroxide (27 per cent) added. Further heating and agitation brings the mixture to a state of colloidal suspension.

(2) Fifty-five grams of casein are soaked for one hour at 66° C. in 250 cc. of distilled water, then 5 grams of NaF added. After 10 minutes, 6 grams of sodium tetraborate dissolved in 25 cc. of water are added and the whole mix held at 66° C. for one hour.

(3) Fifty grams of casein are soaked in 250 cc. of distilled water for one hour, then 5 grams of $Na_2CO_3$ added and the mix heated for one hour at 65° C. Any skin can be dispersed by stirring while the mix is hot.

Sodium silicate and triethanolamine may also be used to peptize the casein. Proteins such as hemoglobin and egg albumen may be made into colloidal solutions by the same methods as casein. Proteins such as glue and glycine require no peptizing agent in the formation of the colloidal solution.

The surface treatment of the pigment with the proteinaceous substance may be conveniently effected by mixing the pigment with a colloidal solution of the protein, prepared as indicated above, or in any other convenient manner. Thus for example the zinc oxide pigment may be mixed with the colloidal casein (or other protein) solution in such proportions that the protein added is about 1 to 2% of the zinc oxide by weight.

The mixing of the colloidal solution with the zinc oxide pigment may be carried out as follows: The protein solution may be sprayed on the zinc oxide pigment and mixed with the pigment by treatment in an edge runner or chaser. In operating by this method, the edge runner may be so operated as to evolve enough heat to expel the moisture introduced into the pigment by the protein solution. In consequence, no special drying step is necessary before the final disintegration of the pigment, when this method of mixing is adopted.

It is also possible to add water along with the colloidal protein solution in sufficient amounts to form a paste or slurry, containing say 50% pigment and 50% water. The paste of pigment, water and associated protein is milled for several hours, say four hours, and is then filter-pressed. The filter-cake is then dried, say for about 36 hours, in galvanized iron trays in an oven, or other suitable heating chamber, at a temperature of from about 105 to 110° C. The dried filter-cake is then crushed and distintegrated in the manner customary to produce the improved dry pigment of the invention.

Protein-coated rubber pigments may be used in rubber compounding in much the same manner as the corresponding uncoated pigments. In order to improve the dispersion of the protein-coated pigment in rubber, it is desirable to disintegrate the pigment to a state of high dispersion. When the dried filter cake obtained after the treatment of the pigment with protein solution is soft, the amount of disintegration on grinding requisite to produce the necessary high state of dispersion is substantially less than when the filter-dried cake is hard. A relatively soft filter-cake may be obtained by using sodium silicate or triethanolamine as peptizing agent in the preparation of the protein solution with which the pigment is treated.

Vulcanized rubber compounds prepared with the protein-treated pigments display an increased modulus of elasticity, that is to say the load requisite to produce a given elongation or stretch of the rubber (say for example 300 or 500%) is increased. The abrasion resistance and tear resistance of the rubber compounds are also substantially increased. In order to secure increased tear resistance, care must be taken to secure adequate dispersion of the pigment in the rubber compound, for example by including a dispersing agent such as sodium silicate in the colloidal protein solution, hereinbefore explained.

Casein and glue have previously been added separately to rubber compounds (that is to say, added separately from the pigment) in order to increase the modulus of elasticity of rubber. Some increase in modulus can be realized by the addition of relatively large amounts of proteinaceous materials (10 to 15 per cent) in the dry form to the rubber mix on the mill, and a similar increase can be realized by the addition of relatively small amounts (one to two per cent) if the proteinaceous material is added in a way to insure good dispersion in the rubber mix (either by masterbatching or in the form of a colloidal suspension). The extent of the improvement by any of these methods is relatively small compared with the improvement obtained resulting from the use of the protein-coated pigments. Thus, when the proteinaceous substance is applied to the pigment before incorporating the pigment in the rubber, very small amounts namely 1 or 2% on the weight of the pigment, are sufficient to secure an improvement greatly in excess of that obtained by the separate addition of casein or glue to the rubber compound.

The following tables indicate the improved physical properties, particularly increased modulus of elasticity, imparted to vulcanized rubber compounds by protein-coated pigments. The rubber compounding formula was the same in each example. In Example 1, ordinary zinc oxide was used. In Example 2, a glue-coated zinc oxide (2% glue by weight) was used, and in Example 3, a casein-coated zinc oxide (2% casein by weight) was used.

Compounding formula:

| | Parts by weight |
|---|---|
| Rubber | 100 |
| Sulphur | 3 |
| Accelerator (mercapto-benzothiazole) | 1 |
| Stearic acid | 3 |
| Antioxidant (naphthylamine) | 1 |
| Zinc oxide | 100 |

*Example 1.—Zinc oxide*

| Time of cure in mins. at 20 lbs. | Tensile strength, lbs. per sq. in. | Percent elong. | Load (lbs. sq. in.) for elongation of— | |
|---|---|---|---|---|
| | | | 300% | 500% |
| 15 | 3380 | 835 | 310 | 925 |
| 30 | 4110 | 765 | 460 | 1500 |
| 45 | 4080 | 725 | 560 | 1835 |
| 60 | 3890 | 705 | 565 | 1810 |
| 75 | 3880 | 695 | 610 | 1830 |
| 90 | 3620 | 675 | 605 | 1850 |

*Example 2.—Glue-coated zinc oxide*

| Time of cure in mins. at 20 lbs. | Tensile strength, lbs. per sq. in. | Percent elong. | Load (lbs. sq. in.) for elongation of— | |
|---|---|---|---|---|
| | | | 300% | 500% |
| 15 | 3020 | 670 | 540 | 1690 |
| 30 | 3440 | 660 | 635 | 2100 |
| 45 | 3540 | 625 | 830 | 2380 |
| 60 | 3390 | 605 | 855 | 2430 |
| 75 | 3240 | 580 | 915 | 2550 |
| 90 | 3100 | 585 | 895 | 2430 |

*Example 3.—Casein-coated zinc oxide*

| Time of cure in mins. at 20 lbs. | Tensile strength, lbs. per sq. in. | Percent elong. | Load (lbs. sq. in.) for elongation of— | |
|---|---|---|---|---|
| | | | 300% | 500% |
| 15 | 3720 | 715 | 510 | 1685 |
| 30 | 4040 | 635 | 735 | 2460 |
| 45 | 4150 | 615 | 1010 | 2760 |
| 60 | 3970 | 590 | 1090 | 3060 |
| 75 | 3780 | 565 | 1070 | 3040 |
| 90 | 3700 | 550 | 1110 | 3080 |

In the following examples, the compounding formula was the same as in the preceding example. Ordinary zinc oxide was used in each example. In Example 4, 2% of glue by weight was added to the rubber stock on the mill, and in Example 5, 2% of casein by weight was added to the rubber stock on the mill. It will be noted that the modulus of elasticity in Examples 2 and 3 is very substantially greater than in Examples 4 and 5.

*Example 4.—2% Glue added to stock*

| Time of cure in mins. at 20 lbs. | Tensile strength, lbs. per sq. in. | Percent elong. | Load (lbs. sq. in.) for elongation of— | |
|---|---|---|---|---|
| | | | 300% | 500% |
| 15 | 2,450 | 700 | 340 | 940 |
| 30 | 3,620 | 695 | 500 | 1,540 |
| 45 | 3,580 | 655 | 530 | 1,735 |
| 60 | 3,850 | 655 | 560 | 1,870 |
| 75 | 3,640 | 620 | 635 | 1,940 |
| 90 | 3,280 | 615 | 605 | 1,810 |

*Example 5.—2% Casein added to stock*

| Time of cure in mins. at 20 lbs. | Tensile strength, lbs. per sq. in. | Percent elong. | Load (lbs. sq. in.) for elongation of— | |
|---|---|---|---|---|
| | | | 300% | 500% |
| 15 | 2,280 | 675 | 340 | 915 |
| 30 | 3,220 | 655 | 525 | 1,530 |
| 45 | 3,380 | 640 | 550 | 1,760 |
| 60 | 3,320 | 620 | 565 | 1,735 |
| 75 | 3,145 | 615 | 590 | 1,780 |
| 90 | 3,040 | 600 | 570 | 1,790 |

In the foregoing examples, the compounding formula has a fairly high zinc oxide loading (100 parts by weight ZnO to 100 parts rubber). The following examples indicate the advantageous increase in modulus of elasticity imparted by relatively small amounts of protein-coated pigments to tread compounds where the high modulus requirements make it customary to use high carbon black content and low zinc oxide content. In Example 6 ordinary zinc oxide was used, while in Example 7 the casein-coated zinc oxide (2% casein) was used. In Example 8, the amount of zinc oxide (coated with 2% casein) was increased to 15 parts, the added 10 parts replacing an equivalent volume of carbon black.

Compounding formula:

| | Parts by weight |
|---|---|
| Rubber | 100 |
| Stearic acid | 4 |
| Pine tar | 3 |
| Zinc oxide | 5 |
| Carbon black | 40 |
| Sulphur | 3 |
| Accelerator (mercapto-benzothiazole) | 1.25 |

*Example 6.—Zinc oxide (parts 5 by weight)*

| Time of cure in mins. at 20 lbs. | Tensile strength, lbs. per sq. in. | Percent elong. | Load (lbs. sq. in.) for elongation of— | |
|---|---|---|---|---|
| | | | 300% | 500% |
| 45 | 4,120 | 715 | 750 | 2,060 |
| 60 | 4,160 | 695 | 960 | 2,460 |
| 75 | 4,260 | 660 | 1,030 | 2,660 |

*Example 7.—Casein-coated zinc oxide (5 parts by weight)*

| Time of cure in mins. at 20 lbs. | Tensile strength, lbs. per sq. in. | Percent elong. | Load (lbs. sq. in.) for elongation of— | |
|---|---|---|---|---|
| | | | 300% | 500% |
| 45 | 4,200 | 680 | 870 | 2,380 |
| 60 | 4,220 | 665 | 1,020 | 2,640 |
| 75 | 4,320 | 620 | 1,230 | 3,120 |

*Example 8.—Casein-coated zinc oxide (15 parts by weight) carbon black (36.8 parts by weight)*

| Time of cure in mins. at 20 lbs. | Tensile strength, lbs. per sq. in. | Percent elong. | Load (lbs. sq. in.) for elongation of— | |
|---|---|---|---|---|
| | | | 300% | 500% |
| 45 | 3,840 | 680 | 760 | 2,120 |
| 60 | 4,160 | 665 | 960 | 2,560 |
| 75 | 4,100 | 625 | 1,150 | 2,780 |

It will be seen from Examples 7 and 8 that pigments, particularly zinc oxide, treated with proteins in accordance with the invention can be advantageously used with carbon black in compounding of rubber for tire treads. The known advantages resulting from high zinc oxide content are obtained thereby, with no decrease in resistance to abrasion.

I claim:

1. The improvement in rubber compounding which comprises milling a pigment with a proteinaceous substance to produce dry substantially unagglomerated pigment particles coated with the proteinaceous substance and thereafter adding said particles to a rubber compound.

2. The improvement in rubber compounding which comprises adding to a rubber compound dry milled substantially unagglomerated pigment particles coated with a proteinaceous substance.

3. The improvement in rubber compounding which comprises milling zinc oxide pigment with a proteinaceous substance to produce dry substantially unagglomerated zinc oxide pigment particles coated with the proteinaceous substance and thereafter dispersing said particles in a rubber compound.

4. The improvement in rubber compounding which comprises dispersing in a rubber compound milled dry substantially unagglomerated zinc oxide pigment particles coated with a proteinaceous substance.

5. The improvement in rubber compounding which comprises milling zinc oxide pigment with a proteinaceous substance to produce substantially dry and unagglomerated zinc oxide particles coated with from 1 to 2% by weight of the pigment of the proteinaceous substance, and thereafter incorporating said particles in a rubber compound.

6. The improvement in rubber compounding which comprises dispersing in a rubber compound milled substantially dry and unagglomerated pigment particles coated with from 1 to 2% by weight of the pigment of casein.

7. The improvement in rubber compounding which comprises dispersing in a rubber compound milled substantially dry and unagglomerated pigment particles coated with from 1 to 2% by weight of the pigment of glue.

8. The improvement in rubber compounding which comprises milling zinc oxide pigment with glue to produce milled substantially dry and unagglomerated zinc oxide pigment particles coated with from 1 to 2% by weight of the pigment of glue and thereafter adding said particles to a rubber compound and dispersing said particles in said rubber compound.

GEORGE S. HASLAM.